United States Patent

Maley et al.

[15] 3,671,763

[45] June 20, 1972

[54] TERNARY LATCHES

[72] Inventors: Gerald A. Maley, Fishkill; James L. Walsh, Hyde Park, both of N.Y.

[73] Assignee: International Business Machines Corporation, Armonk, N.Y.

[22] Filed: Feb. 5, 1971

[21] Appl. No.: 112,935

[52] U.S. Cl. ..............................307/209, 307/289, 328/205
[51] Int. Cl. .......................................................H03k 19/08
[58] Field of Search ................................307/209, 289–292; 328/205

[56] References Cited

UNITED STATES PATENTS

| | | | |
|---|---|---|---|
| 3,223,930 | 12/1965 | Haile | 307/214 |
| 3,176,154 | 3/1965 | Salter | 307/209 |
| 3,207,922 | 9/1965 | Gruodis | 307/209 |
| 3,492,496 | 1/1970 | Callan | 307/209 |

OTHER PUBLICATIONS

A. J. Groudis, Three Level, Non-Saturating Inverting Latch, Nov. 1961, Vol. 4, No. 6, I.B.M. Tech. Disc. Bull. pp. 31–33.

K. M. Trampel, I.B.M. Tech. Disc. Bull., Three Transistor Ternary Latch, Vol. 7, No. 6, Nov. 1964, p. 542.

*Primary Examiner*—Rudolph V. Rolinec
*Assistant Examiner*—David M. Carter
*Attorney*—Hanifin & Jancin and Martin G. Reiffin

[57] ABSTRACT

Two latch circuits are disclosed for three-state operation in the ternary mode. The set input may be raised to a 1 or intermediate voltage level thereby providing a 1 level at the output which remains latched at that level after the set input is lowered to the 0 or lowermost level. When the set input is raised to the uppermost or 2 level the output is set at the 2 level and remains latched at that level when the set input is lowered to the 0 level. The circuits are reset to 0 by raising the reset input to the 2 level.

9 Claims, 3 Drawing Figures

PATENTED JUN 20 1972 3,671,763

INVENTORS
GERALD A. MALEY
JAMES L. WALSH

BY Martin G. Reiffin
ATTORNEY

TERNARY LATCHES

BACKGROUND OF THE INVENTION

1. Field of the Invention

The present invention utilizes ternary algebra wherein the variables may take on three values as distinguished from the two values of Boolean or binary algebra. Within this ternary system the invention is embodied in a latch circuit; that is, a circuit wherein the output may be set to either the intermediate or the uppermost level and then reset to the lowermost level.

2. Description of the Prior Art

Whereas latches are well known in the prior art operating in the binary mode, the present inventors do not know of any prior latch which operates in the ternary mode.

SUMMARY OF THE INVENTION

It is a primary object of the present invention to provide a novel latch circuit operable in the ternary mode.

The two latches disclosed herein are particularly advantageous in that they are simple, stay out of saturation, and may be designed so as to be compatible with other logic circuits.

DESCRIPTION OF THE PREFERRED EMBODIMENTS

Figures 1, 2, 3:
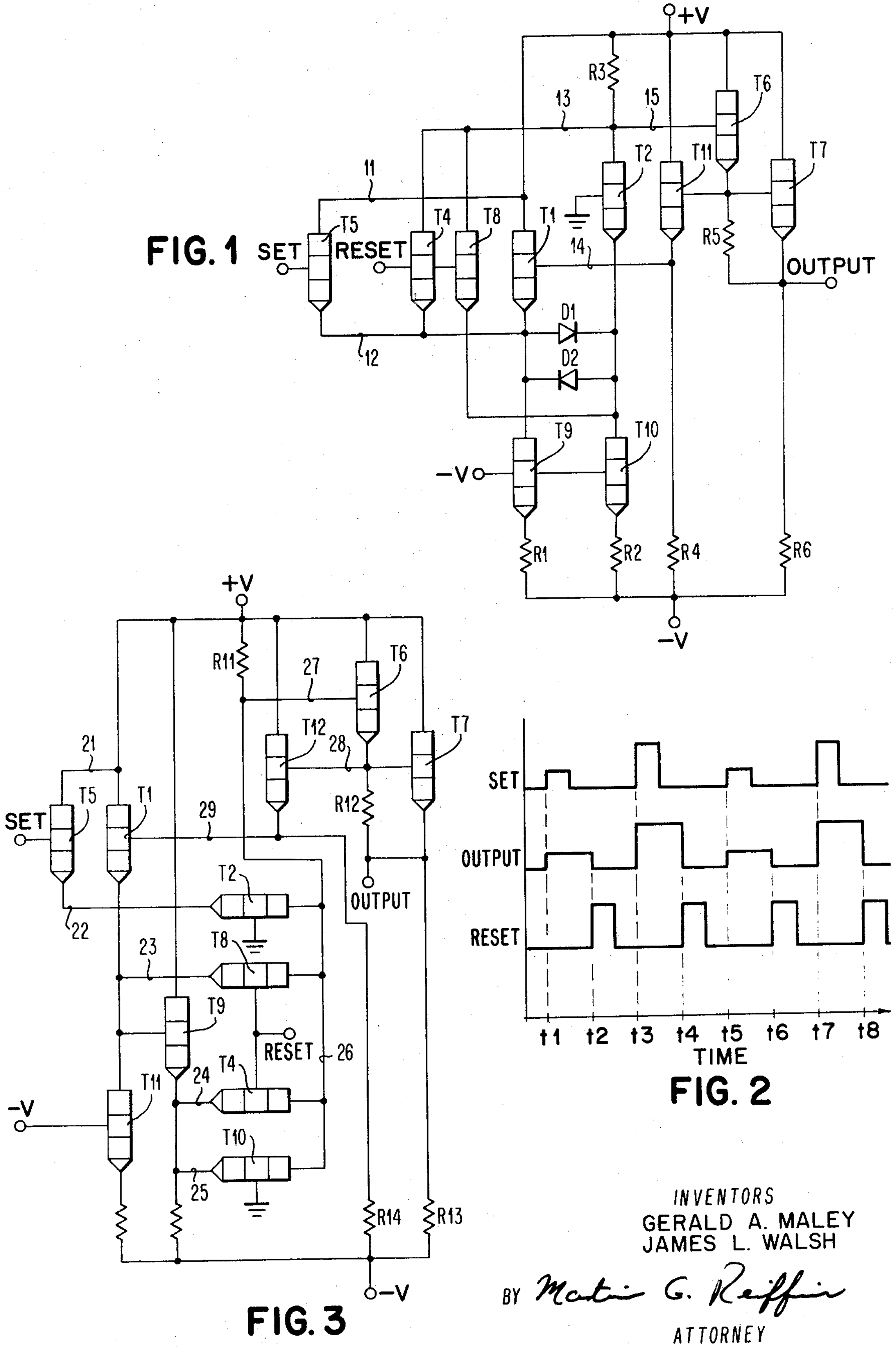
FIG. 1 is a circuit diagram showing one embodiment of the present invention.
FIG. 2 is a timing chart showing the time relation of the output signal and the set and reset input signals.
FIG. 3 is a circuit diagram of a modified form of the invention.

Referring now to FIG. 1 in more detail, the set input is applied to the base of a transistor T5 having its collector connected by a lead 11 to the collector of a transistor T1. The emitters of transistors T5, T1 are connected by a lead 12 which is also connected to the emitter of a transistor T4. The reset input is applied to the base of the latter.

The collector of transistor T4 is connected to the collector of a transistor T8. The emitter of transistor T8 is connected to the emitter of a transistor T2. Diodes D1 and D2 extend with opposite polarities between the emitter of a transistor T1 and the emitter of transistor T2. The collector of transistor T2 is connected by a lead 13 to the collectors of transistors T4 and T8.

Transistors T9 and T10 constitute constant current sources. A resistor R1 extends from the emitter of transistor T9 to a potential source —V and a resistor R2 similarly extends from the emitter of transistor T10 to said potential source. The collector of transistor T9 is connected to lead 12 and the emitters of transistors T1, T4 and T5. The collector of transistor T10 is connected to the emitter of transistor T2. The latter has a base which is grounded as shown. A load resistor R3 extends from the collector of transistor T2 and lead 13 to a potential source +V. Also connected to the latter is the collector of a transistor T11 having its emitter connected to the upper end of a resistor R4 having its lower end extending to the negative potential source —V. A feedback lead 14 extends from the emitter of transistor T11 to the base of transistor T1.

Transistors T6 and T7 constitute an emitter-follower arrangement. A lead 15 extends from the lower end of resistor R3 to the base of transistor T6. The collector of the latter extends to the positive potential source +V. The emitter of transistor T6 is connected to the bases of transistors T7 and T11 and also to the upper end of a resistor R5 having its lower end connected to the emitter of transistor T7. A resistor R6 has its upper end connected to the lower end of resistor R5 and the emitter of transistor T7. The lower end of resistor R6 is connected to the negative potential source —V. The output is taken at the junction of resistors R5 and R6 and the emitter of transistor T7.

The operation of the circuit of FIG. 1 is as follows: Assume the output is at the lowermost signal level. In this condition transistor T2 conducts two units of current from the transistors T9, T10. One unit of current comes directly from the transistor T10 and the other unit comes from transistor T9 through diode D2. Diode D1 is off and transistor T1 is off. To set a 1 into the latch, that is, to provide that the output be at the intermediate or 1 level, the set input at the base of transistor T5 is raised to a 1 level. This shuts off transistor T1 and diode D2 and reduces the current in transistor T2 to one unit of current. If the set input is now dropped to 0, T1 will conduct the current that was formerly flowing through transistor T5, namely one unit, and the latch will store a 1. To set a 2 into the latch the set input is raised to a 2 level. This shuts off diode D2 and transistor T2. Diode D1 now conducts one unit of current to transistor T10. When the set input is returned to 0, transistor T1 will take over conduction from transistor T5 and the latch will store a 2. It should be noted that the set input is capable of raising the output level and that the reset input must be a 0 while the set input is active. The reset input is capable of stepping the latch down to a 0 level. During reset the set input must be at 0.

The reset operation is as follows. Assume that the latch is in a 2 state, then transistor T1 will be conducting two units of current. If the reset input is raised to a 2 level the transistor T8 will conduct, diode D1 will shut off, and the current in transistor T1 will be reduced to one unit. Transistor T4 will now take over conduction and transistor T1 will shut off. If the reset input is returned to 0, transistor T2 will take over conduction of two units of current from transistors T8 and T4. The latch is now reset to 0. If the latch were in the 1 state then only T4 would conduct during the reset operation.

The above described cycle of operation is displayed graphically in FIG. 2. At times T1 and T5 the set input is raised to an intermediate level raising the output to its intermediate level. At times T2, T4, T6 and T8 the reset input is raised to its uppermost level, lowering the output to its lowermost level. At times T3 and T7 the set input is raised to its uppermost level, thereby raising the output to its uppermost level.

Referring now to FIG. 3, there is shown a modified form of the invention which operates in a manner similar to that described above with respect to FIG. 1. In FIG. 3 the set input is applied to the base of transistor T5. The collector of transistor T5 is connected to the collector of transistor T1 by a lead 21. The emitter of transistor T5 is connected by a lead 22 to the emitter of a transistor T2. The base of the latter is grounded as shown. Connected to the emitter of transistor T1 by a lead 23 is the emitter of a transistor T8. Also connected to the emitter of transistor T1 is the base of a transistor T9. The emitter of the latter is connected by a lead 24 to the emitter of a transistor T4 and by a lead 25 to the emitter of a transistor T10. The base of the latter is grounded. The collectors of transistors T2, T8, T4, and T10 are connected by a lead 26 to the lower end of a resistor R11 having its upper end connected to the positive potential source +V. The lower end of resistor R11 is connected by a lead 27 to the base of a transistor T6 which together with transistor T7 constitutes an emitter-follower arrangement. The emitter of transistor T6 is connected to the upper end of a resistor R12 having its lower end connected to the emitter of a transistor T7. The output is taken at the emitter of transistor T7 which is connected to the upper end of resistor R13 having its lower end connected to the negative potential source —V. The collectors of transistors T6 and T7 are connected to the positive potential source +V. The base of transistor T7 is connected by a lead 28 to the upper end of resistor R12.

A transistor T12 is provided with its collector connected to the positive potential source +V and its emitter is connected to the upper end of a resistor R14 having its lower end connected to the negative potential source —V. The emitter of transistor T12 is connected by a lead 29 to the base of transistor T1.

The operation of the latch circuit of FIG. 3 is as follows. Assume a 0 is stored in the latch. Transistors T2 and T10 conduct one unit of current each. Transistors T1 and T9 are off. If the set input to transistor T5 is raised to the intermediate level 1, transistor T2 is shut off and the output rises to a 1. If the set input is thereafter dropped to 0, transistor T1 assumes conduction from transistor T5 and a 1 is stored in the latch circuit. If the set input is raised to the uppermost or 2 level, transistors T2 and T10 are shut off, and the output rises to the 2 level. If the set input is then dropped to 0, transistors T1 and T9 assume conduction from transistor T5 and a 2 is stored. The set input is capable of raising the output. During set time the reset line must be at 0.

The reset operation for the latch of FIG. 3 is substantially the same as that described for the latch in FIG. 1. The operation of the latch of FIG. 3 is also described by the timing chart shown in FIG. 2.

It is to be understood that the specific embodiments disclosed herein are merely illustrative of two of the many forms which the invention may take in practice and that numerous modifications thereof will readily occur to those skilled in the art without departing from the scope of the invention delineated in the appended claims which are to be construed as broadly as permitted by the prior art.

We claim:

1. A ternary latch circuit comprising
 a set input, a reset input, and an output,
 means for latching the output at an intermediate signal level in response to raising of the signal to the set input from a lowermost level to an intermediate level,
 means for latching the output at an uppermost signal level in response to the application of an uppermost level signal to the set input, and
 means for resetting the output to a lowermost level signal in response to the application of a raised level signal to the reset input.

2. A ternary latch circuit as recited in claim 1 and comprising
 means for maintaining said output signal at said intermediate level after said signal at the set input returns to a lowermost level, and
 means for maintaining said output signal at said set input returns to a lowermost level.

3. A ternary latch circuit as recited in claim 1 wherein said several means comprise
 constant current source means providing two units of current,
 a load resistor,
 means connecting said output to said load resistor,
 means for causing one unit of current to flow through said load resistor in response to the application of an intermediate level signal to the set input, and
 means for bypassing both units of current around said load resistor in response to the application of an uppermost level signal to the set input.

4. A ternary latch circuit comprising a set input adapted to assume any one of three signal levels, an output adapted to assume any one of three signal levels, and
 means for latching the output at an intermediate signal level in response to raising of the signal to the set input from a lowermost level to an intermediate level.

5. A ternary latch circuit as recited in claim 4 and comprising
 means for providing an uppermost level signal at the output in response to the application of an uppermost level signal to the set input.

6. A ternary latch circuit as recited in claim 4 and comprising
 a reset input, and
 means for resetting the output to a lowermost level signal in response to the application of a raised level signal to the reset input.

7. A ternary latch circuit as recited in claim 4 and comprising
 means for maintaining said output signal at said intermediate level after said signal at the set input returns to a lowermost level.

8. A ternary latch circuit comprising
 a set input adapted to assume any one of three signal levels, an output adapted to assume any one of three signal levels,
 means for latching the output at an uppermost signal level in response to the application of an uppermost level signal to the set input, means for latching the output at an intermediate level
 a reset input, and
 means for resetting the output to a lowermost signal level in response to the application of a signal to the reset input.

9. A ternary latch circuit as recited in claim 8 and comprising
 means for maintaining said output signal at said uppermost level after said signal at the set input returns to a lowermost level.

* * * * *